United States Patent
Schell et al.

[11] Patent Number: 5,622,638
[45] Date of Patent: Apr. 22, 1997

[54] METHOD FOR FORMING AN ENVIRONMENTALLY RESISTANT BLADE TIP

[75] Inventors: Jerry D. Schell, Evendale; Howard J. Farr, Blue Ash; Thomas J. Kelly, Cincinnati, all of Ohio; Paul J. E. Monson, Wilmington, N.C.; Stephen J. Ferrigno, Cincinnati, Ohio

[73] Assignee: General Electric Company, Cincinnati, Ohio

[21] Appl. No.: 647,523

[22] Filed: May 15, 1996

Related U.S. Application Data

[62] Division of Ser. No. 551,689, Nov. 1, 1995, which is a continuation of Ser. No. 290,662, Aug. 15, 1994.

[51] Int. Cl.⁶ .............. B23K 26/00; C23C 4/00; F01D 11/08
[52] U.S. Cl. .................................. 219/121.64
[58] Field of Search ............... 219/121.64; 416/241 R; 148/410; 428/678, 679, 680

[56] References Cited

U.S. PATENT DOCUMENTS

| | | | |
|---|---|---|---|
| 4,169,020 | 9/1979 | Stalker et al. | 204/16 |
| 4,292,076 | 9/1981 | Gigliotti et al. | 75/170 |
| 4,299,860 | 11/1981 | Schaefer et al. | 416/241 R |
| 4,677,035 | 6/1987 | Fiedler et al. | 428/680 |
| 4,685,977 | 8/1987 | Chang | 148/410 |
| 4,689,242 | 8/1987 | Pike | 427/34 |
| 4,758,480 | 7/1988 | Hecht et al. | 428/680 |
| 4,808,055 | 2/1989 | Wertz et al. | 416/224 |
| 4,878,965 | 11/1989 | Gostic et al. | 148/404 |
| 5,023,050 | 6/1991 | Gerdes et al. | 416/241 R |
| 5,104,293 | 4/1992 | Eaton, Jr. | 416/241 B |
| 5,160,822 | 11/1992 | Aleshin | 219/121.64 |
| 5,264,011 | 11/1993 | Brown et al. | 51/309 |
| 5,316,866 | 5/1994 | Goldman et al. | 428/621 |
| 5,556,594 | 9/1996 | Frank et al. | 148/410 |

FOREIGN PATENT DOCUMENTS 573928  12/1993  European Pat. Off. ......... 219/121.64

*Primary Examiner*—Geoffrey S. Evans
*Attorney, Agent, or Firm*—Andrew C. Hess; David L. Narciso

[57] ABSTRACT

A method for forming a blade tip on a turbine blade of a gas turbine engine includes providing a powder alloy from a family of environmentally-resistant powder alloys and forming the blade tip by melting and fusing the powder alloy to the turbine blade. The blade tip alloys preferably have a chemical composition of, in weight percent, about 14 to about 18 percent chromium, about 6.45 to about 6.95 percent aluminum, about 9.75 to about 11.45 percent cobalt, about 5.95 to about 6.55 percent tantalum, about 1.85 to about 2.35 percent rhenium, about 0.05 to about 1.75 percent hafnium, about 0,006 to about 0.03 percent zirconium, about 0.02 to about 0.11 percent carbon, up to about 1.1 percent silicon, up to about percent 0.01 percent boron, with the balance being nickel and typical impurities.

13 Claims, 2 Drawing Sheets

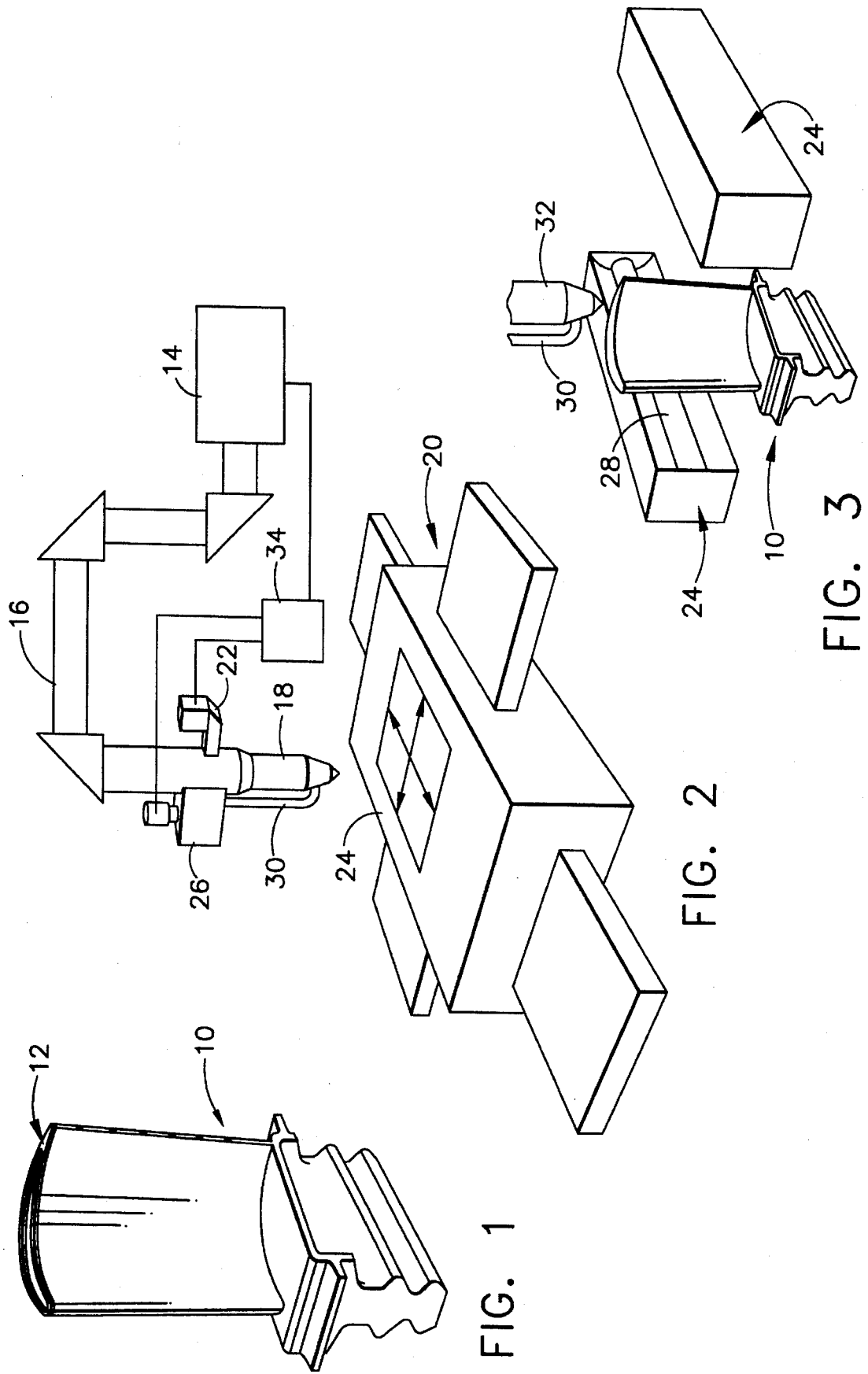

METHOD FOR FORMING AN ENVIRONMENTALLY RESISTANT BLADE TIP

This application is a division of application Ser. No. 08/551,669, filed Nov. 1, 1995 which is an FWC of application Ser. No. 08/290,662, filed Aug. 15, 1994.

The present invention relates to turbine blades used in the high pressure turbine section of a gas turbine engine, in which a protective aluminide or overlay coating is used to enhance the hot corrosion and oxidation resistance of the turbine blades. More particularly, this invention relates to such a turbine blade having a blade tip which is alloyed to be resistant to hot corrosion and oxidation, and characterized by suitable mechanical properties such as high stress rupture, while also being capable of being reliably fused to the blade.

BACKGROUND OF THE INVENTION

The operation of axial flow gas turbine engines involves the delivery of compressed air to the combustion section of the engine where fuel is added to the air and ignited, and thereafter delivered to the turbine section of the engine where a portion of the energy generated by the combustion process is extracted by a turbine to drive the engine compressor. Accordingly, the efficiency of gas turbine engines is dependent in part on the ability to minimize leakage of compressed air between the turbine blades and the shroud of the engine's turbine section. To minimize the gap between the turbine blade tips and the shroud, turbine blades often undergo a final rotor grind such that the turbine rotor assembly closely matches its shroud diameter. As a result, some degree of rubbing with the shroud typically occurs during operation due to manufacturing tolerances, differing rates of thermal expansion and dynamic effects.

Turbine blades alloys are primarily designed to meet mechanical property requirements such as creep rupture and fatigue strengths. However, many turbine engines must operate under conditions which promote hot corrosion and oxidation of the turbine blades formed from such alloys. Therefore, to enhance their environmental resistance, an aluminide or overlay coating is often applied to the blades in order to provide a protective and adherent layer of alumina scales. However, the above-noted machining and rubbing to which the blades are subjected often results in the removal of the aluminide or overlay coating at the blade tips. As a result, the underlying blade material is exposed, leading to corrosion and/or oxidation that causes tip recession or failure, which potentially leads to performance losses due to higher leakage between the blades and the shroud.

From the above, it can be appreciated that both new and worn turbine blades could benefit from being equipped with blade tips which are alloyed to be inherently resistant to oxidation and hot corrosion, such that removal of the blade's aluminide or overlay coating at the blade tip would not effect the environmental resistance of the blade.

While blade tip repair methods are known in the art, as evidenced by U.S. Pat. No. 4,808,055 to Wertz et al., such methods have not identified blade tip alloys which satisfy the mechanical and environmental properties required for operation in a gas turbine engine, while also being capable of being reliably bonded to the turbine blade.

In particular, prior art blade tip alloys which exhibit desirable mechanical properties, such as high temperature stress rupture life, and environmental properties, such as resistance to hot corrosion and oxidation, have been prone to microcracking during deposition onto the turbine blade. Conversely, other prior art alloys have been identified which exhibit adequate tungsten inert gas (TIG) welding or laser fusing characteristics, but do not have the requisite mechanical and/or environmental properties.

Accordingly, it would be advantageous to provide an improved blade tip alloy for turbine blades of gas turbine engines, in which the blade tip alloy is characterized by suitable mechanical properties such as high temperature stress rupture life and desirable environmental properties such as resistance to oxidation and hot corrosion, while further having desirable weldability characteristics.

SUMMARY OF THE INVENTION

It is therefore an object of this invention to provide a turbine rotor blade whose blade tip is formed from an environmentally-resistant alloy which is highly resistant to hot corrosion and oxidation.

It is a further object of this invention that such an alloy exhibit suitable mechanical properties, such as high temperature stress rupture life.

It is another object of this invention that such an alloy be capable of being readily and reliable fused to the tip of the turbine blade, so as to minimize structural flaws such as microcracking.

In accordance with a preferred embodiment of this invention, these and other objects and advantages are accomplished as follows.

According to the present invention, there is provided a family of environmentally-resistant alloys which are suitable for forming a blade tip for a turbine blade of a gas turbine engine. The blade tip alloys of this invention preferably have a chemical composition of, in weight percent, of about 14 to about 18 percent chromium, about 6.45 to about 6.95 percent aluminum, about 9.75 to about 11.45 percent cobalt, about 5.95 to about 6.55 percent tantalum, about 1.85 to about 2.35 percent rhenium, about 0.5 to about 1.75 percent hafnium, about 0.006 to about 0.03 percent zirconium, about 0.02 to about 0.11 percent carbon, up to about 1.1 percent silicon, up to about 0.01 percent boron, with the balance being nickel and typical impurities. As such, the blade tip alloys of this invention differ from that of alloys typically used to form a conventional turbine blade.

A preferred method by which the above alloys of this invention are used to form a blade tip on a turbine blade involves the steps of providing an alloy of this invention in the form of a powder, and then forming a blade tip by melting and fusing the powder alloy to the tip of the turbine blade. For certain applications, the blade tip may be formed by depositing the molten powder alloy utilizing a weld stitching pattern characterized by a weld path which traverses the length of the chord of the turbine blade while cyclicly traversing the width of the turbine blade, generally in a zig-zag manner. The rate of deposition is characterized by an instantaneous velocity $V_i$ along the weld path and an average velocity $V_a$ by which the weld path advances in the direction of the chord length of the turbine blade. Importantly, it has been found that maintaining the ratio of $V_i$ to $V_a$ at about 3:1 to about 12:1 significantly reduces stresses created during deposition, and thereby minimizes microcracking of the blade tip. Preferably, the blade tip is generated by depositing the molten alloy powder in multiple passes. In accordance with this invention, the forming step may be used to generate a near-net shape blade tip, or a subsequent machining step may be employed to generate the final preferred shape of the blade tip.

In accordance with the present invention, the relatively narrow compositional range of the blade tip alloy yields a turbine blade tip characterized by suitable mechanical properties such as high temperature stress rupture life, desirable environmental properties such as resistance to oxidation and hot corrosion, and desirable weldability characteristics. As such, the removal of a blade's aluminide or overlay coating at its blade tip will not significantly effect the environmental resistance of the blade. An additional advantage of the present invention is that both new and worn turbine blades can benefit from being equipped with blade tips formed in accordance with this invention.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which:

FIG. 1 is a perspective view of a high pressure turbine blade equipped with a blade tip in accordance with this invention;

FIGS. 2 and 3 are schematic representations of a suitable laser weld facility for forming the blade tip of this invention;

DETAILED DESCRIPTION OF THE INVENTION

Figure 4:
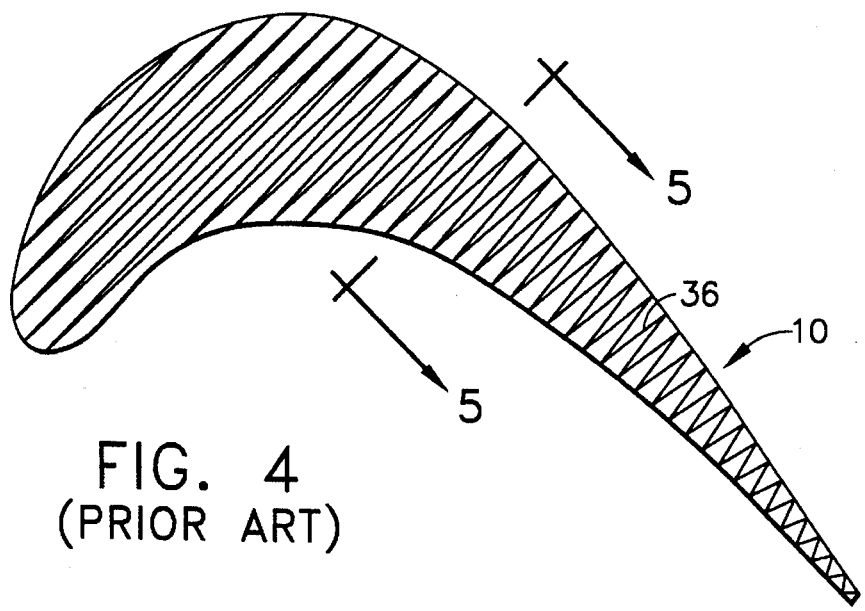
FIG. 4 is a schematic representation of a preferred weld pattern utilized to form the blade tip of FIG. 1.

The present invention provides an improved blade tip for turbine blades used in gas turbine engines, and particularly turbine blades used in the high pressure turbine section of axial flow gas turbine engines. A representative turbine blade 10 is illustrated in FIG. 1, and is shown equipped with a blade tip 12 formed in accordance with one embodiment of this invention. The blade 10 is illustrative of the general geometry of turbine blades known in the art. Viewed from the blade tip end of the blade 10, the blade 10 is characterized by a chord length which extends in the direction of the blade's longest cross-sectional dimension, and by a chord width which is transverse to the chord length.

The blade 10 is preferably formed from a suitable high temperature material, such as an appropriate nickel-based superalloy of the type known in the art, and may be cast as single crystal or directionally solidified casting to promote the high temperature properties of the blade 10.

In accordance with this invention, a family of alloys has been identified which will yield a blade tip 12 having the required mechanical and environmental properties and desirable weldability characteristics for survival in the more hostile environments endured by gas turbine engines. Due to the mechanical properties required of the remainder of the turbine blade 10, the preferred alloys of this invention differ compositionally from that of alloys used to form the turbine blade 10. More specifically, the alloys suitable for the blade 10 have the requisite mechanical properties such as creep rupture and fatigue strength, while the family of alloys of this invention possess the required hot corrosion, oxidation and stress rupture properties specific to the tip portion of the blade 10. As shown in FIG. 1, the blade tip 12 forms the entire tip of the blade 10, and generally has a thickness on the order of about 0.010 to about 0.100 inch (about 0.25 to about 2.5 millimeters) in order to allow for continued environmental protection of the tip even if the tip has been partially removed during final grind or after significant tip rubbing in service.

The alloys of this invention preferably fall within the following compositional range, noted in weight percent:

TABLE I.

| |
| --- |
| about 14 to about 18 chromium; |
| about 6.45 to about 6.95 aluminum; |
| about 9.75 to about 11.45 cobalt; |
| about 5.95 to about 6.55 tantalum; |
| about 1.85 to about 2.35 rhenium; |
| about 0.05 to about 1.75 hafnium; |
| about 0.006 to about 0.03 zirconium; |
| about 0.02 to about 0.11 carbon; |
| up to about 1.1 silicon; |
| up to about 0.01 boron; |
| balance nickel and typical impurities. |

The above alloying range is a modified chemistry of an adherent coating alloy disclosed in U.S. Pat. No. 5,316,866 to Goldman et al., assigned to the assignee of this invention. While the adherent coating alloy taught by Goldman et al. exhibited excellent resistance to oxidation and corrosion, it did not have optimal weldability characteristics. Accordingly, the alloy compositions within the above ranges were particularly alloyed to be optimal for forming the blade tip 12 using an economical welding operation suitable for manufacturing conditions.

A suitable welding facility for purposes of this invention is disclosed in U.S. Pat. No. 5,160,822 to Aleshin, assigned to the assignee of this invention, and is schematically illustrated in FIGS. 2 and 3. The method taught by Aleshin utilizes laser fusing techniques, powder alloys and computerized numerical control of a target blade. As illustrated in FIG. 2, such a facility includes a laser 14, an enclosed beam delivery 16, laser focusing optics 18, a part positioning system 20, a vision system for part location and laser path control 22, a preheat box 24, and a powder feed system 26. The working and coordination of the individual parts of the facility are controlled through a computerized system controller 34. FIG. 3 shows in greater detail the preheat box 24, a blade 10 to be processed, quartz lamps 28, a powder feed line 30 extending from the powder feed system 26, and a laser beam tube 32 which directs a laser beam at the tip of the blade 10. In a conventional manner, the powder enters the laser beam in close proximity to the blade 10 as it is manipulated to cause melting and weld build-up.

In accordance with Aleshin, the blade tip 12 of this invention can be formed using a weld stitch pattern illustrated in FIG. 4. As illustrated, the preferred weld stitch pattern is characterized by a weld path 36 which traverses the chord of the turbine blade 10 while cyclicly traversing the width of the turbine blade 10, generally in a zig-zag manner. The rate of deposition is characterized by an instantaneous velocity $V_i$ along the weld path and an average velocity $V_a$ in the direction which the weld path advances along the chord length of the turbine blade. Importantly, the $V_i$ to $V_a$ ratio must be maintained at about 3:1 to about 12:1 in order to significantly reduce stresses created during deposition, and thereby minimize microcracking of the blade tip 12 formed from one of the alloys of this invention.

Figure 5:
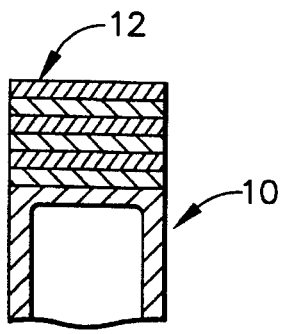
FIG. 5 is a cross-sectional view of a blade tip which may be generated with the weld pattern of FIG. 4.

Preferably, the blade tip 12 is generated by depositing the molten alloy powder in multiple passes, as represented by the multiple layers shown in the cross-sectional view of FIG. 5. Laser power levels for this process preferably provide a power density order of magnitude of about $10^4$ watts per square centimeter. Particularly desirable results are achieved by utilizing gradually increasing laser power during the deposition of the first several weld layers, until a preferred power level is attained and thereafter maintained for the remainder of the multiple passes, while employing a relatively low powder feed rate, on the order of about 2 to about 10 grams per minute, during the first several passes and thereafter increased to about 3 to about 30 grams per minute for the remainder of the multiple passes. This technique has been found to assure proper fusion with the alloy of the turbine blade 10 without excessive heat. Additional weld process parameters required may vary based on blade alloy and geometry, but a preferred component-specific process can be readily identified by one skilled in the art in view of the teachings of Aleshin.

Figure 6:
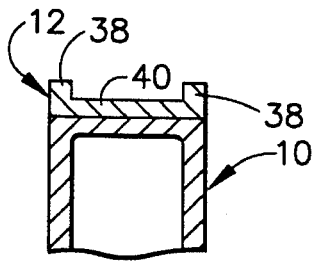
FIGS. 6 and 7 are cross-sectional views of squealer blade tip configurations which may be machined from the blade tip of FIG. 5.
Figure 7:
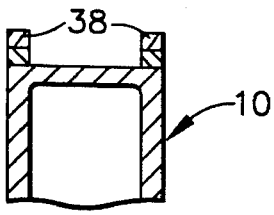

In accordance with this invention, a near-net shape blade tip 12 can be generated with the preferred laser fusing technique, or a subsequent machining step may be employed to generate the final shape of the blade tip 12. Alternative configurations which may be machined from the solid blade tip 12 shown in FIGS. 1 and 5 are illustrated in FIGS. 6 and 7, which depict blade tips in the form of squealer tips, as they are commonly referred to in the art. The blade tip 12 may be machined from the blade tip 12 shown in FIG. 5 to leave only squealers 38 at the perimeter of the blade tip 12, as shown in FIG. 7, or a portion 40 of the blade tip 12 may be left intact with the blade 10 as shown in FIG. 6.

Figure 8:
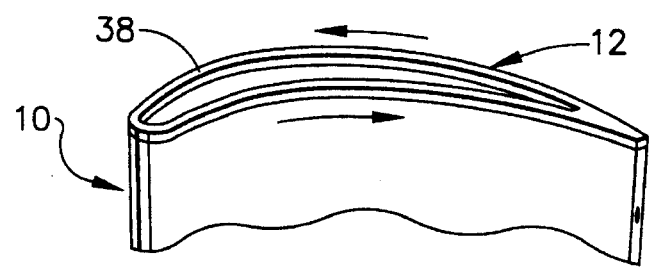
FIG. 8 is a perspective view of a turbine blade equipped with a squealer blade tip configuration.
Figure 9:
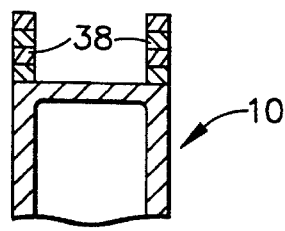
FIGS. 9 and 10 are cross-sectional views of alternative blade tip configurations for the turbine blade of FIG. 8.
Figure 10:
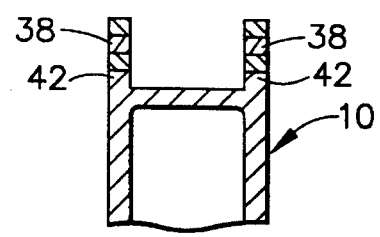

Alternatively, the squealers 38 may be formed with the laser fusing technique at near-net shape, as represented by FIG. 8. With this technique, the blade tip 12 is generated by depositing the molten alloy powder in multiple passes along a weld path which repeatedly traces the airfoil contour, in a manner similar to that discussed with respect to FIG. 5. An advantage to this approach is that the amount of weld material which must be machined is reduced, but the resulting blade tip 12 is more prone to weld and heat affected zone cracking from residual stresses developed from the more complex weld bead contour, in that the weld stitch pattern of FIG. 4 cannot be utilized. However, this type of weld process may be preferable for tips formed on blades formed from certain alloys and/or with certain geometries. As illustrated in FIG. 9, a new blade 10 can be equipped with squealers 38, or a blade 10 with pre-existing but worn squealers 42 can be repaired with new squealers 38 as shown in FIG. 10.

While the laser fusing technique of Aleshin is preferred, it is foreseeable that similar results can be achieved using tungsten inert gas (TIG) or plasma transferred arc (PTA) weld methods using a wire or powder of the blade tip alloys of this invention. Other alternative methods, such as detonation gun (D-gun), hyper velocity oxygen/fuel (HVOF), high energy plasma or vacuum plasma spray (VPS; also referred to as low pressure plasma spray (LPPS)) thermal spray methods may also be successfully used to form suitable blade tips with the alloys of this invention, though these processes may require additional steps, such as heat treatments or hot isostatic pressing, in order to achieve comparable stress rupture lives.

Other potentially suitable techniques for generating a blade tip 12 are disclosed in U.S. Pat. Nos. 4,305,792, 4,789,441 and 4,810,334, which involve a composite plating process which entraps fine powder particles of the alloying ingredients in an electroplated nickel matrix, and subsequently diffusion heat treats the plated deposit to develop the desired mechanical and environmental properties. Again, however, various heat treatment modifications may be required for enhancing final mechanical and/or environmental properties.

The above-noted preferred family of alloys of this invention were identified through a series of tests. One finding of preliminary testing was that the segregation of yttrium to the grain boundaries during welding promoted microcracking problems associated with the nickel-yttrium eutectic. Accordingly, and contrary to the coating alloy taught by Goldman et al., emphasis was placed on compositions with no intentional yttrium content and attention to those elements which affect grain boundaries and environmental properties of superalloy-type coatings. In addition, the compositions were alloyed to contain relatively low levels of boron to promote their weldability. More generally, the elements were selected and varied with the objective of determining alloys which could increase the creep rupture strength of the welded blade tip 12 in order to allow a thickness of up to about 0.150 inch (about 38 millimeters), to minimize weld microcracking, and for improved hot corrosion and oxidation properties.

In accordance with the above, an experimental range was established for each element, and eighteen castings of alloy compositions within the experimental ranges were prepared and tested to determine their solidus and liquidus temperatures and longitudinal and transverse (lateral) stress rupture lives at about 2100° F. and 2 ksi. Four of the compositions were then selected for full evaluation as laser welded deposits from powder alloy. The experimental range and the composition ranges of the four selected alloys, in weight percent, and test results for the four alloys were as follows:

TABLE II.

|  | | ALLOY | | | |
| --- | --- | --- | --- | --- | --- |
|  | Exp. | A | B | C | D |
| CHROMIUM | 15–18 | 18 | 15 | 15 | 15 |
| ALUMINUM | 6.5 nom. | 6.5 | 6.5 | 6.5 | 6.5 |
| COBALT | 10 nom. | 10 | 10 | 10 | 10 |
| TANTALUM | 6 nom. | 6 | 6 | 6 | 6 |
| RHENIUM | 2 nom. | 2 | 2 | 2 | 2 |
| HAFNIUM | 0.05–1.5 | 1 | 1.5 | 1.5 | 0.5 |
| SILICON | 0–1 | 0 | 1 | 0 | 0.5 |
| ZIRCONIUM | 0.006–0.03 | 0.03 | 0.015 | 0.015 | 0.015 |

TABLE II.-continued

|  | Exp. | ALLOY | | | |
|  |  | A | B | C | D |
| --- | --- | --- | --- | --- | --- |
| CARBON | 0.02–0.1 | 0.1 | 0.02 | 0.1 | 0.05 |
| BORON | 0–0.01 | 0.004 | 0.004 | 0 | 0.01 |
| NICKEL | bal. | bal. | bal. | bal. | bal. |
| Solidus (°F.) |  | 2326 | 2203 | 2366 | 2362 |
| Liquidus (°F.) |  | 2456 | 2437 | 2458 | 2468 |
| Stress Rupture (hrs): |  |  |  |  |  |
| Longitudinal |  | 121.4 | 185.2 | >400 | >400 |
| Lateral |  | 61.0 | 85.15 | 201.3 | 149.2 |

Generally, Alloy A was characterized as having high chromium, a moderate solidus temperature and good rupture life, Alloy B was characterized as having a low solidus temperature and a wide melting range, Alloy C was characterized as having an exceptional stress rupture life and a high solidus temperature, and Alloy D was characterized as having an excellent stress rupture life.

Powders suitable for laser fusing were then prepared of Alloys A–D. From the powders, pin specimens were made for environmental testing, and blade tips were formed on nickel superalloy turbine blades for metallographic evaluation. The environmental testing involved a hot corrosion test conducted at about 1700° F., 5 ppm sea salt, with depth of penetration being measured after about 200 hours, and an oxidation test conducted at about 2150° F., Mach 1, with depth of penetration being measured after about 200 hours. The results were as follows:

TABLE III.

|  | HOT CORROSION | OXIDATION |
| --- | --- | --- |
| Alloy A | about 0.000 inch | about 0.0023 inch |
| Alloy B | about 0.000 inch | about 0.0012 inch |
| Alloy C | about 0.000 inch | about 0.0012 inch |
| Alloy D | about 0.000 inch | about 0.0023 inch |

The above results indicated that all of the alloys were highly resistant to hot corrosion and oxidation, even without a protective aluminide or overlay coating, and that Alloys B and C exhibited particularly excellent environmental resistance. Blade tips 12 were then formed using the preferred laser fusing technique described above and examined metallographically, with the result being that all of the alloys exhibited minimal microcracking, with Alloys B and C having a lower level of microcracking than Alloys A and D.

From the above, Alloys B and C were identified as being preferred blade tip compositions for purposes of this invention. Generally, each exhibit improved inherent environmental resistance so as to allow removal of material and/or a blade's protective coating without degrading the environmental properties of the blade. Simultaneously, Alloys B and C enable the use of the laser fusing technique described above, which provides for an economical process that yields minimal weld microcracking due to the unique combination of alloy chemistry and laser weld technique. Alloy B is believed to be more compatible with blade alloys having lower melting points due to its lower solidus temperature, while Alloy C is believed to be more compatible with blade alloys having higher melting points.

Further assessment of Alloys B and C using known Taguchi statistical methods generated preferred chemistries and tolerances, in weight percent, for Alloys B and C, as follows.

TABLE IV.

|  | ALLOY | | Tolerance (±) |
|  | B | C |  |
| --- | --- | --- | --- |
| CHROMIUM | 16.00 | 15.60 | 1.00 |
| ALUMINUM | 6.7 | 6.7 | 0.25 |
| COBALT | 10.50 | 10.70 | 0.75 |
| TANTALUM | 6.20 | 6.30 | 0.25 |
| RHENIUM | 2.05 | 2.15 | 0.20 |
| HAFNIUM | 1.60 | 1.60 | 0.15 |
| SILICON | 0.90 | 0.2 max | 0.20 (Alloy B) |
| ZIRCONIUM | 0.018 | 0.018 | 0.01 |
| CARBON | 0.030 | 0.100 | 0.01 |
| BORON | 0.005 | 0.002 max | 0.002 (Alloy B) |
| NICKEL | bal. | bal. |  |

From the above, it can be seen that an advantage of the present invention is that the relatively narrow preferred compositional range of the blade tip alloy yields a turbine blade tip characterized by mechanical properties such as high temperature stress rupture life, desirable environmental properties such as resistance to oxidation and hot corrosion, and desirable weldability characteristics. As such, for a turbine blade equipped with the blade tip of this invention, the removal of an aluminide or overlay coating at the blade tip will not significantly effect the environmental resistance of the blade. An additional advantage of the present invention is that the benefits of the blade tip alloy and the method by which the blade tip is formed are applicable to both new and worn turbine blades. Finally, the preferred technique by which the blade tip is generated further promotes a strong weld, so as to maximize the overall mechanical properties of the turbine blade.

While our invention has been described in terms of a preferred embodiment, it is apparent that other forms could be adopted by one skilled in the art. Therefore, the scope of our invention is to be limited only by the following claims.

The embodiments of the invention in which an exclusive property or privilege is claimed are defined as follows:

1. A method for forming a blade tip on a turbine blade of a gas turbine engine, the method comprising the steps of;
   providing a powder alloy consisting, in weight percent, essentially of about 14 to about 18 percent chromium, about 6.45 to about 6.95 percent aluminum, about 9.75 to about 11.45 percent cobalt, about 5.95 to about 6.55 percent tantalum, about 1.85 to about 2.35 percent rhenium, about 0.05 to about 1.75 percent hafnium, about 0.006 to about 0.03 percent zirconium, about 0.02 to about 0.11 percent carbon, up to about 1.1 percent silicon, up to about 0.01 percent boron, with the balance being nickel and typical impurities;
   forming the blade tip by melting and fusing the powder alloy to the turbine blade.

2. The method of claim 1 wherein the forming step utilizes a weld stitching pattern characterized by a weld path which traverses the chord of the turbine blade while cyclicly traversing the width of the turbine blade, the rate of deposition being characterized by an instantaneous velocity $V_i$ along the weld path and an average velocity $V_a$ by which the weld path advances along the chord of the turbine blade, the ratio of $V_i$ to $V_a$ being about 3:1 to about 12:1 so as to reduce stresses created during deposition and thereby minimize microcracking of the blade tip.

3. The method of claim 1 wherein the forming step utilizes a weld pattern characterized by a weld path which traverses the airfoil contour of the turbine blade.

4. The method of claim 1 wherein the forming step comprises depositing the molten powder in multiple passes.

5. The method of claim 4 wherein the forming step comprises utilizing a gradually increasing power for melting and fusing the powder alloy to the turbine blade during a first number of the multiple passes until a first power level is attained, and thereafter maintaining the first power level for the remainder of the multiple passes.

6. The method of claim 4 wherein the forming step comprises utilizing a first powder alloy feed rate during a first number of the multiple passes, and thereafter utilizing a second powder alloy feed rate for the remainder of the multiple passes, the second powder alloy feed rate being higher than the first powder alloy feed rate.

7. The method of claim 1 wherein the forming step generates a near-net shape blade tip.

8. The method of claim 1 further comprising a machining step following the forming step.

9. The method of claim 1 wherein the forming step is a laser fusing process.

10. The method of claim 1 wherein the powder alloy consists, in weight percent, essentially of:

about 15 to about 17 percent chromium;
about 6.45 to about 6.95 percent aluminum;
about 9.75 to about 11.25 percent cobalt;
about 5.95 to about 6.45 percent tantalum;
about 1.95 to about 2.25 percent rhenium;
about 1.45 to about 1.75 percent hafnium;
about 0.008 to about 0.028 percent zirconium;
about 0.02 to about 0.04 percent carbon;
about 0.7 to about 1.1 percent silicon;
about 0.003 to about 0.007 percent boron;
with the balance being nickel and typical impurities.

11. The method of claim 1 wherein the powder alloy consists, in weight percent, essentially of:

about 14.6 to about 16.6 percent chromium;
about 6.45 to about 6.95 percent aluminum;
about 9.95 to about 11.45 percent cobalt;
about 6.05 to about 6.55 percent tantalum;
about 1.95 to about 2.35 percent rhenium;
about 1.45 to about 1.75 percent hafnium;
about 0.008 to about 0.028 percent zirconium;
about 0.09 to about 0.11 percent carbon;
up to about 0.2 percent silicon;
up to about 0.002 percent boron;
with the balance being nickel and typical impurities.

12. The method of claim 1 wherein the powder alloy differs from that of the remainder of the turbine blade.

13. The method of claim 1 wherein the blade tip is a worn blade tip, such that the method entails repairing the worn blade tip.

* * * * *